United States Patent
Karppi et al.

(10) Patent No.: US 12,467,204 B2
(45) Date of Patent: Nov. 11, 2025

(54) METHOD FOR ON-SITE GLYOXYLATION OF POLYACRYLAMIDE

(71) Applicant: KEMIRA OYJ, Helsinki (FI)

(72) Inventors: Asko Karppi, Espoo (FI); Matti Hietaniemi, Espoo (FI)

(73) Assignee: KEMIRA OYJ, Helsinki (FI)

( * ) Notice: Subject to any disclaimer, the term of this patent is extended or adjusted under 35 U.S.C. 154(b) by 442 days.

(21) Appl. No.: 17/906,359

(22) PCT Filed: Mar. 17, 2021

(86) PCT No.: PCT/FI2021/050190
§ 371 (c)(1),
(2) Date: Sep. 15, 2022

(87) PCT Pub. No.: WO2021/186109
PCT Pub. Date: Sep. 23, 2021

(65) Prior Publication Data
US 2023/0129116 A1    Apr. 27, 2023

(30) Foreign Application Priority Data

Mar. 18, 2020 (FI) ..................................... 20205273

(51) Int. Cl.
| | |
|---|---|
| D21H 17/45 | (2006.01) |
| C08F 8/10 | (2006.01) |
| C08F 220/56 | (2006.01) |
| D21H 17/37 | (2006.01) |
| D21H 17/44 | (2006.01) |
| D21H 21/10 | (2006.01) |
| D21H 21/18 | (2006.01) |

(52) U.S. Cl.
CPC ............ *D21H 17/455* (2013.01); *C08F 8/10* (2013.01); *C08F 220/56* (2013.01); *D21H 17/375* (2013.01); *D21H 17/44* (2013.01); *D21H 21/10* (2013.01); *D21H 21/18* (2013.01); *C08F 2800/10* (2013.01)

(58) Field of Classification Search
None
See application file for complete search history.

(56) References Cited

U.S. PATENT DOCUMENTS

| | | | |
|---|---|---|---|
| 4,196,253 | A | 4/1980 | Spence |
| 9,637,865 | B2 | 5/2017 | Rosencrance et al. |
| 10,927,200 | B2 | 2/2021 | Kerman |
| 2006/0003772 | A1 | 1/2006 | Semper |
| 2006/0270801 | A1 | 11/2006 | Hagiopol et al. |
| 2008/0149287 | A1* | 6/2008 | Hagiopol ............... D21H 17/44 525/267 |
| 2013/0160959 | A1 | 6/2013 | Rosencrance |
| 2016/0201269 | A1 | 7/2016 | Wright |
| 2017/0037575 | A1 | 2/2017 | Hund et al. |
| 2017/0247489 | A1* | 8/2017 | Tekobo ................ D21H 17/37 |
| 2017/0306065 | A1* | 10/2017 | Kerman ................ D21H 21/18 |
| 2017/0342663 | A1 | 11/2017 | Zhang et al. |
| 2020/0277735 | A1* | 9/2020 | Borkar ................... D21H 17/24 |

FOREIGN PATENT DOCUMENTS

| | | |
|---|---|---|
| WO | 2011002677 A1 | 1/2011 |
| WO | 2017005562 A1 | 1/2017 |
| WO | 2017185110 A1 | 11/2017 |
| WO | 2018052420 A1 | 3/2018 |
| WO | 2018122446 A1 | 7/2018 |
| WO | 2018134675 A1 | 7/2018 |

OTHER PUBLICATIONS

International Search Report and Written Opinion, in connection with International Application No. PCT/FI2021/050190, dated Jun. 18, 2021.
Finnish Search Report, in connection with Finnish Application No. 20205273, dated Oct. 13, 2020.
Search report and English translation thereof from the State Intellectual Property Office of the People's Republic of China in corresponding application CN2021800161482; dated on Jul. 11, 2023; 5p.
English translation of Search report in corresponding application CN2021800161482, Dated Jan. 17, 2024, 2 pages.

* cited by examiner

*Primary Examiner* — Marc S Zimmer
(74) *Attorney, Agent, or Firm* — Meunier Carlin & Curfman LLC

(57) ABSTRACT

Disclosed is method for on-site glyoxylation of polyacrylamide in a paper or board mill, where a discontinuous batch glyoxylation reaction of aqueous reaction mixture is performed in reactor vessel having driven agitator to form aqueous polymer composition comprising glyoxylated polyacrylamide. The method comprises forming or obtaining the aqueous reaction mixture comprising polyacrylamide base polymer and glyoxal, determining alkali consumption of the mixture, and adding to the mixture, based on determined alkali consumption, pre-determined amount of alkali for adjusting pH to 8-10. The temperature is optionally adjusted to 15-40° C. and the on-site glyoxylation reaction of polyacrylamide base polymer is allowed to proceed. Viscosity of the mixture and/or a variable related to the viscosity is measured, acid is added to the mixture for lowering pH to <8, when a predetermined end viscosity value is attained, and the aqueous polymer composition comprising glyoxylated polyacrylamide is removed from the reaction vessel.

18 Claims, No Drawings

METHOD FOR ON-SITE GLYOXYLATION OF POLYACRYLAMIDE

FIELD OF THE INVENTION

The present invention relates to a method for on-site glyoxylation of polyacrylamide in a paper mill, board mill or the like according to the preambles of the enclosed independent claims.

BACKGROUND OF THE INVENTION

Board, especially corrugated container board, is one of the most used packaging materials in the world due to its low price, light-weight structure, and recyclability.

However, container boards also have limitations. One of the major drawbacks of the container board is its poor water and moisture resistance. The main building blocks of the container board are amphiphilic cellulose-based fibres whose hydrophilic hydroxyl groups impart mechanical strength to the fibres, but at the same time make them susceptible to moisture. This means that in humid conditions the strength of the board may rapidly deteriorate.

Many goods are nowadays produced in countries with humid environmental conditions, e.g. in Southeast Asia, from where they are shipped all over the world. Corrugated containerboard is also used for packaging of moist or humidity creating goods, such as fruits, vegetables or frozen food products, and/or stored in humid environments, e.g. in cooled storage space. As the packages are exposed to humidity from the environment or from the packed goods during the transport and/storage, the strength of packages is reduced. In the end this may even result in collapse of the packages. Consequently, there is an increased need for providing improved strength properties for container board and equivalent fibre products, even in humid conditions.

Another challenge in packages produced from corrugated container board is the so-called score cracking. Score cracking refers to the fibre dislocation on the outside of container board along the score line on the edge area of the package. The outside surface of the container board is subjected to stretching when the folding along the score line is made. Surface sizing may improve the tensile strength of the board, but the board may become brittle because strain is not increased. Score cracking is a quality defect and its occurrence should be minimised in manufacture of packages from board and the like.

Glyoxylated polyacrylamide (GPAM) and compositions comprising glyoxylated polyacrylamide are commonly used in manufacture of paper, board or the like for improving the properties of the final product. Polyacrylamide polymers may be formed by polymerising acrylamide and cationic monomers, which are able to create ionic linkages with anionic fibre surfaces. Molecular weight, i.e. length, of polyacrylamide backbone is an important parameter for the polymer function, as a long backbone provides sufficient dimensions that allow bonding and linkages between the fibre surfaces. Glyoxylation makes the polyacrylamide polymer crosslinked. Crosslinked structure improves drainage and dewatering ability of the polyacrylamide and has less negative impact on sheet formation compared to linear polyacrylamide polymer of similar molecular weight.

Glyoxylated polyacrylamide is a reactive polymer that can covalently bind with cellulose, and thus provides improvement e.g. in strength properties. For example, dry strength and/or wet strength properties of paper and board can be improved by addition of glyoxylated polyacrylamide to the stock suspension. In general, good formation and good bonding ability provided by the glyoxylated polyacrylamide are beneficial for the strength properties of the final paper or board, measured by ring crush test (RCT), bursting strength and Concora medium test (CMT). These strength describing parameters are important especially in manufacture of liner, testliner or fluting board grades.

High molecular weight glyoxylated polyacrylamide is advantageous for the strength properties of paper or board, especially if the paper or board is manufactured from furnish comprising recycled fibres. In these cases, one of the challenges is often the high ash content of the furnish, which requires high enough molecular weight from the backbone of the polyacrylamide polymer. Otherwise the inorganic particles between the fibres may obstruct the bond formation and the glyoxylated polyacrylamide does not effectively come into contact with the fibres and form linkages between them. Therefore, the physical size, i.e. molecular weight, of the glyoxylated polyacrylamide polymer has significance for the strength improvement efficiency.

However, glyoxylated polyacrylamide compositions, especially high molecular weight polyacrylamide compositions, have challenges in their commercial use. It is known that the glyoxylated polyacrylamide may have an inadequate storage stability. As stated above, glyoxylated polyacrylamide is formed by crosslinking polyacrylamide-based polymers by using glyoxal. The obtained glyoxylated polyacrylamide polymers are not fully stable, as glyoxal in the aqueous polymer solution tends to continue cross-linking reaction with the polyacrylamide base polymer. This means that the viscosities of the aqueous GPAM solutions usually increase during storage as the cross-linking reaction proceeds. In the end the continuing cross-linking reaction may even lead to gel-formation and render the glyoxylated polyacrylamide unsuitable for use in manufacture of paper, board and the like. Thus, the glyoxylated polyacrylamide and its aqueous solutions have limited shelf-life.

Increasing the molecular weight of the polyacrylamide base polymer for the desired strength performance may lead to extensive gel formation. In order to reduce the risk for cross-linking and gel formation, glyoxylated polyacrylamide polymers are thus often manufactured, transported and stored in form of aqueous solutions, which have fairly low concentration of active glyoxylated polyacrylamide polymer, e.g. 5-7 weight-%. This means that the transportation and storage costs of glyoxylated polyacrylamide compositions are relatively high due to large volumes involved.

Due to the limitations in its storage stability, the glyoxylated polyacrylamide polymers, especially high molecular weight glyoxylated polyacrylamide polymers, are sometimes manufactured on-site at a paper or board mills just before the addition to the process. Some continuous and discontinuous methods for manufacturing glyoxylated polyacrylamide on-site have been suggested. However, the on-site manufacture of glyoxylated polyacrylamide has shown to be complicated in practice. There has been challenges in continuous processes to manufacture glyoxylated polyacrylamide with consistent acceptable quality, while maintaining the throughput of the process on an adequate level, i.e. keeping the reaction time short enough for industrial production. Especially the control of the various process parameters and conditions has been complex.

SUMMARY OF THE INVENTION

An object of this invention is to minimise or possibly even eliminate the disadvantages existing in the prior art.

Another object of the present invention is to provide a simple and effective method for on-site production of glyoxylated polyacrylamide.

Yet another object of the present invention is to provide a method for producing on-site glyoxylated polyacrylamide which can be used to improve the strength properties of paper, board or the like, especially in humid conditions.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

In a typical method according to the present invention for on-site glyoxylation of polyacrylamide in a paper mill, board mill or the like, where a discontinuous batch glyoxylation reaction of an aqueous reaction mixture is performed in a reactor vessel provided with a driven agitator to form an aqueous polymer composition comprising glyoxylated polyacrylamide for use in a manufacturing process of paper, board or the like, the method comprising:

forming or obtaining the aqueous reaction mixture comprising polyacrylamide base polymer and glyoxal;
determining alkali consumption of the reaction mixture;
adding to the reaction mixture, on the basis of the determined alkali consumption, a pre-determined amount of alkali which is needed for adjusting the reaction mixture's pH value within a range of 8-10, preferably 8.5-9.5;
optionally adjusting the reaction mixture's temperature to a temperature range of 15-40° C., more preferably 20-30° C.,
allowing the on-site glyoxylation reaction of polyacrylamide base polymer in the reaction mixture to proceed;
measuring viscosity of the reaction mixture and/or a process variable that is related to the viscosity of the reaction mixture;
adding acid to the reaction mixture for lowering the pH value of the reaction mixture <8, preferably <7, when a predetermined end viscosity value is attained; and
removing the aqueous polymer composition comprising glyoxylated polyacrylamide from the reaction vessel.

Typical use of glyoxylated polyacrylamide prepared according to the method according to the invention is in a manufacture of paper, board, preferably in amount of 0.5-3 kg/t.

Now it has been surprisingly found that no complicated and/or time consuming on-line pH measurement is required for proper control of the on-site glyoxylation reaction of polyacrylamide. By determining the alkali consumption of the reaction mixture proactively before the start of the glyoxylation reaction, it is possible to pre-determine, for example by mathematically calculating, the necessary amount of alkali to be added to the reaction mixture with a sufficient accuracy. In this manner the process for on-site glyoxylation of polyacrylamide can be made simple and effective and the reaction time is kept within reasonable limits while the desired crosslinking level is achieved. It has been found out that the reaction time can be significantly shortened without deterioration of the properties of the glyoxylated polyacrylamide polymer. On the contrary, the present invention provides a possibility to produce glyoxylated polyacrylamide polymer that provides the final product enhanced strength properties, especially in humid conditions. The progress of the glyoxylation process can be efficiently controlled by using simple measurement of viscosity and/or viscosity related parameter(s) without complicated measurement protocols involving variety of different parameters and/or on-line sensors, such as pH meters. The present method can be performed by using equipment usually already existing in the paper and board mills, which makes the method suitable and easily adaptable in practice.

DETAILED DESCRIPTION OF THE INVENTION

The aqueous polymer composition comprising glyoxylated polyacrylamide obtainable by the present invention enables the increase of short-span compression strength (SCT strength) of paper, board or the like in high humidity conditions. Thus the invention can provide the final paper or board with properties, which make them suitable for packages intended for demanding environments and/or for demanding goods, such as fruits or frozen foods. Use of the aqueous polymer composition comprising glyoxylated polyacrylamide obtainable by the present invention may also help to reduce the weight of packages and thereby reduce 002-emissions associated with the packaging and transportation. SCT strength in high humidity conditions is especially needed for fluting to reduce the risk of package collapse during storage and/or transport.

The aqueous polymer composition comprising glyoxylated polyacrylamide obtainable by the present invention also reduce the risk for score cracking. It has been observed that the aqueous polymer composition comprising glyoxylated polyacrylamide obtainable by the present invention can significantly increase the tensile energy adsorption (TEA) of paper, board or the like. In this manner it is possible to produce liner and/or testliner board which has improved strength properties and which is able to withstand stretching when the board is folded along the score line during package production.

In the present context the terms "humid conditions" and "high humidity conditions" are used interchangeably, and they denote environmental conditions with high humidity, where relative humidity is ≥80%, preferably ≥85%, more preferably ≥90%. For example, in high humidity conditions the relative humidity (RH) may be 80-100%. The tests for evaluating high humidity properties, e.g. SCT strength in high humidity, may be performed for example with test stripes which are air conditioned at least 4 hours at 85% RH and 23° C. High humidity conditions typically increase the moisture content of paper or board web to >7%, which decreases the amount of hydrogen bonds between the web constituents. If no countermeasures are taken, such as the present invention, this may lead to decreased web strength.

In the present invention the on-site glyoxylation of polyacrylamide in a paper mill, board mill or the like is performed in a discontinuous batch glyoxylation reaction of an aqueous reaction mixture in a reactor vessel provided with a driven agitator. The term "discontinuous batch glyoxylation reaction" denotes that the reaction mixture materials, e.g. polyacrylamide base polymer, glyoxal, water, etc., are introduced to a reaction vessel in the beginning of the glyoxylation process, and the formed reaction mixture remains in the reaction vessel until the reaction is ended. During the glyoxylation reaction an aqueous polymer composition comprising glyoxylated polyacrylamide is formed. The formed polymer composition comprising glyoxylated polyacrylamide polymer is then removed from the reaction vessel. The reaction cycle for the discontinuous batch glyoxylation reaction starts when a batch of reaction mixture materials are introduced to the reaction vessel, including possible temperature adjustment time or the like, and the reaction cycle ends when the reaction vessel is ready to receive a following batch of reaction mixture materials after the removal of the aqueous polymer composition from reaction vessel, including necessary emptying time and flushing time. In the present invention the reaction cycle may be less than 130 min, preferably less than 100 min. For example, the reaction cycle time may be 35-130 min, preferably 45-100 min or 45-90 min, sometimes even 45-75 min, which enables effective production of glyoxylated polyacrylamide for use in a paper mill, board mill or the like.

In the beginning of the glyoxylation reaction an aqueous reaction mixture comprising at least a polyacrylamide base polymer and glyoxal is obtained or formed into the reaction vessel. According to one embodiment the reaction mixture is formed by separately dosing or metering appropriate amounts of reaction mixture materials including polyacrylamide base polymer, glyoxal and dilution water into the reaction vessel. Alternatively, a pre-mixture comprising polyacrylamide base polymer and glyoxal may be used. The use of a pre-mixture may sometimes be more convenient as the handling of concentrated glyoxal solution can be avoided.

The alkali consumption of the reaction mixture is determined before the alkali is added to the reaction mixture. The alkali consumption of the polyacrylamide base polymer may be determined before the formation or obtaining of the reaction mixture. The alkali consumption is determined to provide the amount of alkali which is required for adjustment of the reaction mixture's pH to a range of pH 8-10. The alkali consumption may be determined, for example, by theoretically calculating and/or estimating the alkali consumption based on properties of the base polymer or the pre-mixture, such as the structure of the base polymer or other available information. Alternatively, the alkali consumption may be determined, for example, by titration of a diluted sample of the polyacrylamide base polymer with an alkali solution to a feasible end level. The feasible end level in the titration of the diluted sample the polyacrylamide base polymer may be higher that the target range of pH 8-10 for the reaction mixture, as the pH of the alkaline polyacrylamide base polymer typically decreases after the glyoxal addition. Preferably, in determining the alkali consumption of the polyacrylamide base polymer the same base polymer concentration and the same alkali concentration are used as in the glyoxylation reaction. If a pre-mixture comprising polyacrylamide base polymer and glyoxal is used for the reaction mixture, then alkali consumption is determined for the pre-mixture, for example by titration.

On basis of the determined alkali consumption the pre-determined amount of alkali, which is needed for adjusting the reaction mixture's pH within a range of 8-10, preferably 8.5-9.5, sometimes 8.7-9.5, is added to the reaction mixture. This means that the determined value for the alkali consumption of the polyacrylamide base polymer or for the pre-mixture is used to pre-determine, for example by calculation, the amount of alkali needed for the adjustment of the pH value of the reaction mixture on an appropriate level. As the alkali consumption of the polyacrylamide base polymer/pre-mixture is used to pre-determine the amount of alkali that is needed for pH adjustment, it possible to avoid problems associated with use of on-line pH meters, whose reliability can sometimes be inadequate and/or unreliable. Furthermore, as the glyoxylation reaction is not controlled by a pH measurement, the reaction cycle time can be significantly reduced, providing an improved efficiency for on-line glyoxylation.

The addition of the alkali leads to the adjustment of the pH value of the reaction mixture from a start pH value to a reaction pH value which resides in the range of pH 8-10, preferably 8.5-9.5, sometimes 8.7-9.5, without pH control or pH measurement(s). Typically, NaOH is used as alkali. In the present invention, the pre-determined amount of alkali is preferably added solely on basis of the alkali consumption of the polyacrylamide base polymer/pre-mixture, and no on-line pH control of the reaction mixture is present during the addition of the alkali or glyoxylation reaction. As the amount of alkali is pre-determined, e.g. based on calculation, and not based on continuously measured pH values from the reaction mixture during the addition, the reaction cycle time can be significantly shortened without deterioration of the properties of the glyoxylated polyacrylamide polymer that is obtained.

The reaction mixture is effectively mixed by the driven agitator when the pre-determined amount of alkali is added to the reaction mixture, and the mixing is continued throughout the glyoxylation reaction. The reaction vessel typically has relatively small reactor volume of <6 m$^3$, preferably <5 m$^3$, more preferably <4 m$^3$. The reactor volume may be, for example, in the range of 0.5-6 m$^3$, preferably 0.75-4 m$^3$, more preferably 1-3 m$^3$. The relatively small reactor volume makes it possible to provide an effective mixing of the reaction mixture with conventional driven agitators for industrial use. Furthermore, the relatively small reaction vessel is easier to fit to on-site on a paper or board mill. It is possible even to make the reaction vessel movable. For example, it can be fitted on a transport pallet and moved with a forklift.

Preferably the reaction vessel does not contain any by-pass circuits that would circulate the reaction mixture or part of it outside the reaction vessel before the end of the glyoxylation reaction. The reaction vessel is thus free of by-pass circuits or the like. It is possible to perform the required measurements, if any, from the reaction mixture residing in the reaction vessel, which means that there is no need for by-pass circuits from which the process samples are removed. This is a clear advantage, as the by-pass circuits or the like are often complicated to maintain in the industrial production of glyoxylated polyacrylamide polymers.

The temperature of the reaction mixture may optionally be adjusted to a temperature range of 15-45° C. or 15-40° C., preferably 20-40° C., more preferably 20-35° C. or 20-30° C. The adjustment of the reaction mixture temperature can be done either before the addition of the alkali, i.e. before the start of the glyoxylation reaction, and/or during the glyoxylation reaction. The temperature adjustment can be achieved by using a reaction vessel that can be cooled/heated. Another alternative to adjust the temperature of the reaction mixture is the addition of hot or cold water to the reaction mixture. For example, the water which is used to form the reaction mixture may be heated or cooled to a suitable temperature. According to one embodiment of the invention the temperature of the reaction mixture is measured during the glyoxylation reaction, for example by using standard temperature sensor(s) fitted in suitable location(s) in the reaction vessel. Preferably the temperature of the reaction mixture may be measured and adjusted throughout the glyoxylation reaction.

When the pH value of the reaction mixture is adjusted with the pre-determined amount of alkali to pH 8-10, the glyoxylation reaction, i.e. crosslinking of the polyacrylamide base polymer, starts. During the glyoxylation reaction the pH of the reaction mixture is preferably maintained within the level of pH 8-10, preferably 8.5-9.5, sometimes 8.7-9.5. Too low reaction mixture pH may decrease reaction speed of the glyoxylation reaction, whereas too high reaction mixture pH increases gelling risk during the glyoxylation.

According to one preferable embodiment of the invention, an additional alkali flow may be fed to the reaction mixture during the progress of the glyoxylation reaction. In practice this means that the pH value of the reaction mixture is first adjusted with the pre-determined amount of alkali to the pH value within the range of pH 8-10, preferably 8.5-9.5, sometimes 8.7-9.5. The pH of the reaction mixture often decreases when the glyoxylation reaction proceeds, which may lead to a decrease of the glyoxylation reaction speed. This can be effectively counteracted by adding the small additional alkali flow to the reaction mixture. The amount of alkali added to the reaction mixture by the additional alkali flow is usually smaller than the calculated amount of alkali added to the reaction mixture. Typically the amount of alkali added by the additional alkali flow may be 5-50 vol-%, preferably 10-30 vol-%, of the calculated amount of alkali.

The effects of reaction mixture pH and temperature to the glyoxylation reaction may at least sometimes be interconnected. High reaction pH, e.g. pH >10, and high temperature, e.g. >40° C. may lead to nearly immediate gelling of the reaction mixture. According to one embodiment of the invention the reaction temperature in the range of 20-25° C. and a reaction mixture pH in the range 8.5-9.5 are preferred during the glyoxylation reaction.

During the glyoxylation reaction the viscosity of the reaction mixture and/or a process variable that is related to the viscosity of the reaction mixture is measured and followed. The measurement(s) can be continuous, or they can be performed at preselected, preferably short, time intervals. The obtained measurement values are used in determining the proper end point of the glyoxylation reaction, i.e. when the desired crosslinking level is reached. According to one preferable embodiment of the invention the viscosity of the reaction mixture is measured indirectly. The viscosity of the reaction mixture can be estimated, measured or determined by measuring torque and/or power consumption of the motor-driven agitator of the reaction vessel, preferably the torque of the driven agitator. When the viscosity of the reaction mixture increases, the power consumption of the driven agitator and the torque increases. Measuring the power consumption and/or torque of the driven agitator provides easy and reliable way to indirectly monitor and measure the viscosity change of the reaction mixture without complicated sensor systems or the like.

Alternatively, or in addition, the viscosity of the reaction mixture may be measured from the reaction mixture by using rotational viscometer, oscillating viscometer or vibrational viscometer. It is also possible to measure the power consumption or torque of the driven agitator and the viscosity of the reaction mixture by using one of the said viscometers.

The on-site glyoxylation of polyacrylamide base polymer in the reaction mixture is allowed to proceed until the pre-determined end viscosity value or viscosity level is attained. The calculated alkali amount, the temperature of the reaction mixture and/or the additional alkali flow are selected so that the reaction time of the glyoxylation reaction is at most 120 minutes. Reaction time for the glyoxylation reaction denotes the time which starts when the calculated amount of alkali is added to the reaction mixture and which ends when the acid is added to the reaction mixture for lowering the pH value of the reaction mixture <8, preferably <7. During the reaction time the reaction mixture obtains the desired glyoxylation level, i.e. crosslinking level of the polyacrylamide base polymer, and an aqueous polymer composition comprising glyoxylated polyacrylamide is formed. Usually it is desired that the reaction time is not too long, which enables effective industrial on-line process. The reaction time for on-site glyoxylation reaction may be in a range of 10-120 minutes or 10-100 minutes, preferably 15-80 minutes, more preferably 20-60, even more preferably 20-50 minutes. A person skilled in the art is able to theoretically calculate or estimate, on basis of his experience and/or few experiments, if necessary, the combination of the alkali amount, the temperature of the reaction mixture and/or the additional alkali flow which are required for attaining the desired reaction time.

The optional feeding of the additional alkali flow can be discontinued before the pre-determined end viscosity value or level is attained, when the viscosity of the reaction mixture has reached certain pre-determined level, close to the pre-determined end viscosity. After discontinuation of the alkali feed, the reaction speed of the glyoxylation decreases. This is beneficial at the late stage of the glyoxylation reaction, as it provides more time to react to the fast increase of the viscosity of the reaction mixture, occurring at the end of the glyoxylation reaction, and makes the measurement or estimation of the end viscosity more accurate.

An acid is added to the reaction mixture for lowering the pH value of the reaction mixture is lowered to pH preferably more preferably when a predetermined end viscosity value or level is attained. This means that when the viscosity of the reaction mixtures attains the pre-determined end viscosity the pH is lowered to pH The lowering of the pH effectively ends the glyoxylation reaction and the crosslinking of the polyacrylamide chains stops. The pH value of the reaction mixture may be lowered to a pH range of 2.5-5, preferably 3-4. The pH is lowered by an addition of an acid, such as formic acid or sulphuric acid, to the reaction mixture.

The pre-determined end viscosity value of the reaction mixture may be 20-60 cP or 20-45 cP, preferably 25-40 cP, more preferably 25-35 cP. The end viscosity value is usually selected to provide an appropriate crosslinking level without risking any gel formation. The end viscosity value for the reaction mixture is at least two times the start viscosity of the reaction mixture and at most nine times the start viscosity of the reaction mixture. Preferably the pre-determined end viscosity value may be 2-7, preferably 2-5, more preferably 2.5-5, times the start viscosity of the reaction mixture. The start viscosity of the reaction mixture can be determined by one of the measuring methods known as such and/or described elsewhere in this application, immediately before the addition of the calculated amount of alkali to the reaction mixture. According to one embodiment of the invention the start viscosity of the reaction mixture may be 4-15 cP, preferably 6-12 cP, more preferably 7-10 cP.

The aqueous polymer composition comprising glyoxylated polyacrylamide is removed from the reaction vessel after the addition of acid. The formed polymer composition comprising glyoxylated polyacrylamide may be removed from the reaction vessel immediately or after a suitable storage time, preferably immediately. The glyoxylated polyacrylamide may be used in the production of paper, board or the like immediately after the glyoxylation reaction is ended or the glyoxylated polyacrylamide may be first stored, either in the reaction vessel or in a separate storage vessel. According to one embodiment of the invention the glyoxylated polyacrylamide may be stored for 0.1-100 h, preferably 0.5-10 h, before its use in the production of paper, board or the like.

According to one preferable embodiment of the present invention the aqueous polymer composition comprising glyoxylated polyacrylamide is transferred from the reaction vessel by a piping via optional storage vessels to the manufacturing process of paper, board or the like, preferably directly after end of the glyoxylation reaction. The obtained aqueous polymer composition comprising glyoxylated polyacrylamide is used in a manufacturing process of paper, board or the like by dosing it to a fibre suspension before formation of web of paper, board, tissue or the like. Preferably the polymer composition is directly transferred by pumping through the pipeline to a fibre suspension which is formed into one or more layers of the final fibre products. Ability to use the obtained polymer composition directly is advantageous as it minimises the risk of gel formation, which may occur during long storage.

By using the present invention the glyoxal is effectively consumed in the glyoxylation reaction, and the obtained aqueous polymer composition comprises low amounts of residual glyoxal. The aqueous polymer composition comprising glyoxylated polyacrylamide preferably comprises 0.1-1.5 weight-%, preferably 0.2-1 weight-% and more preferably 0.2-0.99 weight-% of residual glyoxal, calculated from the total weight of the aqueous polymer composition.

The aqueous polymer composition comprising glyoxylated polyacrylamide, obtained by the present method, may have a viscosity of >20 mPas, preferably >25 mPas and/or <50 mPas, preferably <35 mPas, measured by using Brookfield viscometer at 25° C.

The present method enables the use of polyacrylamide base polymer with relatively high molecular weight. According to one embodiment of the present invention the polyacrylamide base polymer may have a weight average molecular weight in a range of 50 000-300 000 g/mol, preferably 90 000-250 000 g/mol, more preferably 100 000-200 000 g/mol or 110 000-200 000 g/mol, sometimes from 155 000-200 000 g/mol. The weight average molecular weight of the base polymer may be, for example, 115 000-190 000 g/mol, preferably 120 000-170 000 g/mol, more preferably 130 000-160 000 g/mol. As explained above, usually the use of the high molecular weight polyacrylamide base polymer has been associated with great risk of gel formation during glyoxylation reaction, but the present method reduces or eliminates this risk. The higher the molecular weight of the base polymer, the larger the molecular size of the final crosslinked structure, where base polymer chains are crosslinked with glyoxal. Larger structure provides improved strength as well as dewatering properties, especially for furnish comprising recycled fibres and/or having a high ash content.

Preferably the polyacrylamide base polymer is cationic. The polyacrylamide base polymer may be obtained by polymerisation of acrylamide and 7-50 mol-%, preferably 7-30 mol-%, more preferably 11-16 mol-%, of hydrolytically stable cationic monomers. According to one embodiment the polyacrylamide base polymer may be obtained by polymerisation of acrylamide and 6-8 mol-% or 11-14 mol-% of hydrolytically stable cationic monomers. For example, the polyacrylamide base polymer may be obtained by polymerisation of acrylamide and 11-17 mol-%, preferably 11-15 mol-%, of hydrolytically stable cationic monomers. It has been observed that when the amount of cationic monomers is around 10 mol-% the ash retention in the produced paper or board is increased, which reduces the strength effect obtained. According to one embodiment the cationic monomers may be selected from diallyldimethylammonium chloride (DADMAC), 3-(acrylamidopropyl)-trimethylammonium chloride (APTAC), 3-(methacrylamidopropyl)trimethylammonium chloride (MAPTAC), or any combination thereof. Preferably the cationic monomer is diallyldimethylammonium chloride (DADMAC). These cationic monomers, especially at described amounts, are able to provide hydrolytic stability for the reaction mixture.

According to one embodiment the reaction mixture may have a solids content of 2-8 weight-%, preferably 3-7 weight-%, preferably 4-6 weight-%, calculated from the total weight of the reaction mixture. The solid content of the reaction mixture may be, for example, 4.1-6.5 weight-%, preferably 4.4-6.5 weight-%, more preferably 4.4-6.0 weight-%. The solids content of the reaction mixture may be adjusted on proper level by addition of water to the reaction mixture, preferably before the addition of the calculated amount of alkali. A minimum solids content, i.e. concentration of the polyacrylamide base polymer is necessary for viscosity increase, which provides the preferred signal for ending the glyoxylation reaction.

The pH of the reaction mixture, before addition of the alkali, may be in the range of 2-8, preferably 3-7 and more preferably 3-6.

According to one embodiment of the invention the polyacrylamide base polymer and glyoxal are provided as an acidic premixture for forming the reaction mixture. This means that no mixing of separate base polymer and glyoxal is necessary, which reduces handling of the hazardous glyoxal in the mill environment, thus improving the occupational safety. For example, the premixture may comprise a polyacrylamide base polymer comprising at least 5 mol-% of cationic monomers and having a weight average molecular weight MW in the range of 50 000-350 000 g/mol, and 0.1-2 weight-% of glyoxal, calculated from the total weight of the aqueous prepolymer composition. Typically, the pH of the premixture is in the range of 2-4, preferably 2.2-3.5 and more preferably 2.5-3.3. The crosslinking reaction of the premixture is activated when the pH of the reaction mixture is adjusting to an alkaline pH.

According to one aspect, the invention relates also to an aqueous reaction mixture or reaction composition comprising a polyacrylamide base polymer and glyoxal. The composition comprises a polyacrylamide base polymer obtained by polymerisation of (meth)acrylamide and 10-25 mol-% or 10-18 mol-%, preferably 11-17 mol-%, more preferably 11-15 mol-%, of hydrolytically stable monomers, the base polymer having a weight average molecular weight in the range of 115 000-200 000 g/mol, preferably 115 000-190 000 g/mol, more preferably 120 000-170 000 g/mol or 130 000-160 000 g/mol; and 6-25 weigh-%, preferably 10-20 weight-%, more preferably 12-18 weight-% of glyoxal, calculated from the dry weight of the prepolymer composition. The suitable hydrolytically stable cationic monomers have been defined elsewhere in this application. This reaction mixture or reaction composition is suitable for use in the method of the present invention and provides a glyoxylated polyacrylamide, which provides improved strength and/or dewatering effects. The reaction mixture or reaction composition may have solid content in the range of 3-7 weight-%, preferably 4-6.5 weight-% and more preferably 4.5-6.5 weight-% or 4.5-6.0 weight-%.

The aqueous polymer composition comprising glyoxylated polyacrylamide prepared by the present invention is especially suitable for use as a dry strength and/or dewatering agent in manufacturing of paper or board. The aqueous polymer composition comprising glyoxylated polyacrylamide prepared by the present invention provides good dry strength and/or dewatering results particularly when used in manufacture of paper or board which comprise recycled fibres.

According to one preferable embodiment the aqueous polymer composition may be used in manufacture of paper or board for improving strength properties of paper or board in high humidity conditions. The composition is especially suitable for improving SCT strength or tensile energy adsorption of a paper or board.

According to one embodiment the aqueous polymer composition comprising glyoxylated polyacrylamide prepared by the present invention is especially suitable for use in manufacture of fibrous webs, which may have a basis weight (as dry) of at least 20 g/m$^2$, preferably at least 60 g/m$^2$, more preferably at least 80 g/m$^2$, even more preferably at least 100 g/m$^2$. For example, the basis weight of the fibrous web, as dry, may be in a range of 20-500 g/m$^2$, preferably 50-400 g/m$^2$, preferably 60-350 g/m$^2$ or sometimes even 100-200 g/m$^2$.

According to one embodiment, the invention is suitable for manufacture of a fibrous web, which forms a layer in a multi-layered board selected from testliner, kraftliner or corrugated medium. Testliners may comprise a layered structure comprising from two up to four plies, and/or have a basis weight in a range of 80-350 g/m$^2$. Corrugated medium may have a single-ply structure. The basis weight may in a range of 110-180 g/m$^2$.

Some embodiments of the invention are described more closely in the following non-limiting examples.

EXAMPLES

Example 1: Determination of Required Alkali Amount

A series of diluted polyacrylamide base polymer samples were titrated with sodium hydroxide (5.0 wt-%) to determine the required amount of sodium hydroxide to adjust the pH of the reaction mixture to a desired target pH level in the glyoxylation reaction. Each polyacrylamide base polymer was diluted to 4.0 wt-% concentration. 1000 g sample of the diluted polyacrylamide base polymer was taken for a titration test. Each sample was titrated to pH value 9.5 at 25° C. and the required alkali amount was recorded. Then 9.65 g of glyoxal (40%) was added to the polyacrylamide base polymer sample at pH 9.5. The reaction mixture was mixed for 1 min at 25° C. and pH was recorded. Results of the titration test are shown in Table 1.

TABLE 1

Results of Example 1.

| Polyacrylamide base polymer | Base polymer Conc. [%] | Viscosity [mPas] | Reaction mixture start pH | Base polymer MW [g/mol] | Recorded NaOH amount [g] | pH of the reaction mixture after glyoxal addition |
|---|---|---|---|---|---|---|
| BP1 | 34.3 | 1990 | 3.9 | 116 000 | 3.53 | 8.7 |
| BP2 | 33.7 | 3580 | 3.5 | 139 000 | 2.64 | 8.6 |
| BP3 | 34.0 | 2250 | 3.7 | 122 000 | 2.66 | 8.9 |
| BP4 | 33.9 | 2090 | 3.5 | 123 000 | 2.70 | 8.8 |

The results in Table 1 show that pH of reaction mixture is within the desired pH range 8-10 after glyoxal addition. It is possible to determine the required alkali amount by titration of the polyacrylamide base polymer with NaOH solution. The pH of the reaction mixture comprising polyacrylamide base polymer at 4.0 wt-% concentration was adjusted to 9.5 and after glyoxal addition the pH values were between 8.6-8.9. One reason for differences in pH values before and after the glyoxal addition is that pH meter requires at least about 1 min stabilization time after glyoxal addition. However, alkaline glyoxal containing polyacrylamide base polymer solution is not stable as the glyoxal starts to react with the polyacrylamide base polymer, whereby the pH starts decreasing.

Example 2: On-Site Glyoxylation of Polyacrylamide Base Polymer

On-site glyoxylation process for polyacrylamide polymer was performed in a 30-litre pilot reactor. The pilot reactor was protected by an insulation fabric to keep temperature stable inside the pilot reactor. The pilot reactor was equipped with a first stirrer (Heidolph RZR 2102), rotation speed adjusted to 200 rpm, and a second stirrer (Heidolph Hei-Torque Precision 400) with a torque monitoring, rotation speed adjusted to 80 rpm. The pilot reactor was further equipped with an on-line viscometer (Anton Paar, L-Vis 510), a dosing pump for feeding alkali to the reaction mixture, as well as a pH meter for monitoring the pH during the glyoxylation reaction.

The polyacrylamide base polymer, BP3 from Example 1, was a copolymer of acrylamide (77 mol-%) and DADMAC (23 mol-%).

21.7 kg of tap water (25° C.) and 2.89 kg of polyacrylamide base polymer (34%, 25° C.) were dosed into the pilot reactor and mixed for 2 min. Concentration of the polyacrylamide base polymer in the reaction mixture was 4.0 wt-%. 238 g of glyoxal (40%, 25° C.) was dosed into the pilot reactor and mixed for 2 min. Temperature of the reaction mixture was 25° C. 65.4 g of NaOH solution (5%) was added within 1 min time. Reaction time was started when alkali dosing was completed. Temperature, on-line viscosity (Anton Paar viscometer), torque of the agitator and pH were monitored during the reaction. Samples were also taken from the reaction mixture and viscosity was determined by using a Brookfield DV1+ viscometer. After 5 min from the completion of the alkali dosing, pumping of NaOH (5%), flow speed 1.74 ml/min, was started to prevent decrease of the reaction mixture pH. After 32 min of the reaction time start the additional NaOH flow was discontinued. After 54 min from the reaction start 22 g of sulfuric acid (30%) was added to the reaction mixture to stop the glyoxylation reaction. Final glyoxylated polyacrylamide product had viscosity of 33 cP, measured by Anton Paar viscometer, and 35 cP, measured by Brookfield DV1+ viscometer. Detected values of the pilot reactor experiment from the process is shown in Table 2.

TABLE 2

Detected values of the pilot reactor experiment.

| Elapsed reaction time [min] | pH | Anton Paar viscosity [cP] | Torque [Ncm] | Brookfield viscosity [cP] | Temperature [° C.] |
|---|---|---|---|---|---|
| 0 | 8.87 | 6.5 | 10.4 | 7.8 | 24.7 |
| 5 | 8.65 | 8.7 | 10.4 | 7.8 | 24.9 |
| 8 | 8.82 | 4.6 | 10.4 | 7.9 | 25.0 |
| 11 | 8.95 | 3.5 | 10.4 | 8.0 | 25.1 |

TABLE 2-continued

Detected values of the pilot reactor experiment.

| Elapsed reaction time [min] | pH | Anton Paar viscosity [cP] | Torque [Ncm] | Brookfield viscosity [cP] | Temperature [° C.] |
|---|---|---|---|---|---|
| 15 | 9.08 | 4.6 | 10.4 | 8.1 | 25.1 |
| 18 | 9.15 | 4.8 | 10.4 | 8.5 | 25.2 |
| 21 | 9.22 | 4.6 | 10.4 | 9.1 | 25.2 |
| 25 | 9.27 | 8.2 | 10.4 | 10.4 | 25.2 |
| 29 | 9.32 | 9.9 | 11.0 | 12.4 | 25.2 |
| 31 | 9.36 | 12.6 | 11.0 | 14.0 | 25.2 |
| 32 | 9.36 | 13.0 | 11.0 | 14.9 | 25.2 |
| 34 | 9.28 | 12.8 | 11.6 | 16.7 | 25.2 |
| 37 | 9.16 | 15.2 | 12.2 | 18.9 | 25.1 |
| 39 | 9.08 | 17.0 | 12.8 | 19.9 | 25.1 |
| 40 | 9.05 | 18.1 | 12.8 | 22.2 | 25.1 |
| 41 | 8.99 | 19.6 | 13.3 | 22.5 | 25.1 |
| 43 | 8.94 | 20.6 | 13.3 | 25.2 | 25.1 |
| 45 | 8.86 | 22.4 | 13.3 | 25.9 | 25.1 |
| 47 | 8.82 | 24.1 | 13.9 | 27.8 | 25.0 |
| 49 | 8.76 | 25.7 | 13.9 | 30.5 | 25.0 |
| 52 | 8.65 | 28.9 | 14.5 | 34.0 | 25.0 |
| 54 | 8.61 | 30.3 | 14.5 | 34.2 | 25.0 |
| 56 | 3.35 | 33.1 | 14.5 | 35.4 | 25.0 |

Values of Table 1 show that glyoxylated polyacrylamide can be manufactured on-line by using determined analytical values for alkali amount to adjust the pH. On-line viscometer can be used to control glyoxylation rate and viscosity. Torque level of the agitator follows the viscosity values and is thus suitable for monitoring the reaction rate of the glyoxylation reaction mixture.

Example 3: On-Site Glyoxylation, Manufacture of Glyoxylated Polyacrylamide with Different Viscosities On-site glyoxylation process was performed by using the same pilot reactor as in Example 2. The glyoxylation process was identical to that of Example 2, except that the reaction temperature was 30° C.

The polyacrylamide base polymer, BP4 from Example 1, was a copolymer of acrylamide (77 mol-%) and DADMAC (23 mol-%).

Samples of 200 g were taken from the reaction mixture when viscosity of the reaction mixture, measured on-line with Anton Paar viscometer, had reached a desired pre-determined target value, 22.5 cP and 33.2 cP. Samples taken from the reaction mixture were acidified with sulfuric acid (30%). The reaction in the pilot reactor was stopped by adding sulfuric acid to the reaction mixture when the viscosity of the reaction mixture, measured on-line with Anton Paar viscometer, reached a final value of 46.9 cP. Concentration, Brookfield-viscosity and pH were determined from the samples as well as from the reaction mixture. Results are shown in Table 3.

TABLE 3

Results of Example 3.

| | Anton Paar viscosity [cP] | Reaction mixture conc. [%] | Brookfield viscosity [cP] | pH after acidification |
|---|---|---|---|---|
| GPAM Sample 1 | 22.5 | 4.4 | 25.1 | 3.24 |
| GPAM Sample 2 | 33.2 | 4.4 | 38.7 | 3.15 |
| GPAM Sample 3 | 46.9 | 4.4 | 55.8 | 3.03 |

Results in Table 3 show that glyoxylated polyacrylamide with different viscosities can be produced with the on-line process of the invention.

Example 4: Application Example Evaluating the Board Properties Obtainable when Using On-Site Produced Glyoxylated Polyacrylamide The effect of addition of the glyoxylated polyacrylamide produced on-site according to the present invention on SCT (short span compression strength), burst strength, crushing resistance (Corrugating Medium Test (CMT30)) and beta formation is tested in Example 4.

Furnish was prepared from fluting sheets made from European recycled fibre. Sheets (110 g/m$^2$) were formed with Rapid Koethen sheet former (RK) as follows: Furnish was wet disintegrated in 3% consistency at 70° C. with a pulper (Noviprofibre, France) for 30 s at 500 rpm and 25 min at 1000 rpm, without soaking. Wet disintegrated pulp was further diluted to 0.6% with tap water, pH was adjusted to pH 6.8 and conductivity to 3.5 mS/cm. The salt for conductivity adjustment consisted of 70% calcium acetate, 20% sodium sulphate and 10% sodium bicarbonate.

Chemical additions to the furnish were made to dynamic drainage jar type of mixing vessel, mixing speed 1000 rpm.

GPAM Sample 1, GPAM Sample 2 and GPAM Sample 3 from Example 3 were used as a strength additive in the experiments. Dosage amounts were 1.2 and 2.4 kg/t as dry additive per ton dry furnish.

Retention was kept constant in each test and 16% ash content in the sheet was achieved. Cationic polyacrylamide, CPAM (FennoPol K 3500P, Kemira Oyj) was dissolved to 0.5% and further diluted to 0.05% concentration and dosed as retention aid 15 s before drainage. Amount of cationic polyacrylamide was 400 g/t at 0-test and the amount was adjusted according to desired retention level in other tests 1-6. Silica (FennoSil 2180, Kemira Oyj) was diluted to 0.1% concentration, dosed in amount of 400 g/t as dry, as retention aid 10 s before drainage.

Chemical additions are shown in Table 5.

After chemical additions the furnish was poured to RK sheet former and water was drained out through wire with suction. Sheet was removed from the wire and dried with vacuum dryer (93° C., 10 min). Before testing in the laboratory, sheets were pre-conditioned for 24 h at 23° C. in 50% relative humidity, according to the standard ISO 187. Methods and devices for sheet testing are given in Table 4. The indexed strength values are calculated by dividing the strength value by basis weight. Beta formation is measured according to instructions of Ambertec device. Normalized beta formation is same as formation index of Ambertec device.

The results of Example 4 are shown in Table 6.

It is seen from Table 5 that the shows that the GPAM samples produced according to the invention reduced significantly the amount of cationic polyacrylamide that was needed for obtaining the desired retention level. This means that the retention polymer consumption was clearly and unexpectedly decreased. From Table 6 it is seen that SCT and burst indices which are important parameters for liner are improved with all GPAM samples. The highest SCT value was obtained with 1.2 kg/t dosage of GPAM Sample 3. CMT strength, which is an important parameter for fluting board in addition of SCT, is also improved. The highest CMT improvement was achieved with GPAM Sample 1 due to good formation. Low normalized formation indicates improved formation.

TABLE 4

Methods and devices used for testing of produced sheets.

| Measurement | Device | Standard |
|---|---|---|
| Basis weight | Mettler Toledo | ISO 536 |
| Short Span Compression test (SCT) | Lorentzen & Wettre | ISO 9895 |
| Burst strength | Lorentzen & Wettre | ISO 2758 |
| Corrugating Medium Test (CMT30) | Lorentzen & Wettre | ISO 7263 |
| Beta formation | Ambertec, Finland | |

TABLE 5

Chemical additions in Example 4.

| | Dosing time | | | | |
|---|---|---|---|---|---|
| Test | −60 s GPAM Sample 1 [kg/t dry] | −60 s GPAM Sample 2 [kg/t dry] | −60 s GPAM Sample 3 [kg/t dry] | −15 s CPAM [kg/t dry] | −10 s Silica [kg/t dry] |
| 0-test | — | — | — | 0.4 | 0.4 |
| 1 | 1.2 | — | — | 0.15 | 0.4 |
| 2 | 2.4 | — | — | 0.1 | 0.4 |
| 3 | — | 1.2 | — | 0.15 | 0.4 |
| 4 | — | 2.4 | — | 0.1 | 0.4 |
| 5 | — | — | 1.2 | 0.1 | 0.4 |
| 6 | — | — | 2.4 | 0.1 | 0.4 |

TABLE 6

Results of Example 4.

| Test | SCT index [Nm/g] | CMT30 index [Nm$^2$/g] | Burst index [kPam$^2$/g] | Normalised formation [SQRT(g)/m] |
|---|---|---|---|---|
| 0-test | 19.6 | 0.91 | 1.88 | 0.73 |
| 1 | 22.1 | 1.05 | 2.32 | 0.72 |
| 2 | 23.4 | 1.34 | 2.50 | 0.70 |
| 3 | 23.4 | 1.14 | 2.25 | 0.72 |
| 4 | 23.6 | 1.34 | 2.39 | 0.69 |
| 5 | 22.3 | 1.20 | 2.27 | 0.72 |
| 6 | 24.5 | 1.21 | 2.45 | 0.70 |

Example 5: Application Example Evaluating the Effect of Different Base Polymers and Glyoxal Amounts to the Board Properties The effect of different polyacrylamide base polymers and glyoxal amounts on SCT (short span compression strength), burst strength and crushing resistance (Corrugating Medium Test (CMT30)) is tested in Example 5.

The used polyacrylamide base polymers were copolymer of acrylamide and DADMAC. Information about the molecular weight and amount of DADMAC in the base polymer is provided in Tables 7-9.

On-site glyoxylation process was performed by using the same pilot reactor as in Example 2. Concentration of the polyacrylamide base polymer in the reaction mixture was 4.4 wt-%, and various glyoxal amounts, which can be seen from Tables 7-9 were tested. Initial glyoxal contents were 0.44 (10 wt-% from dry), 0.66 (15 wt-% from dry) and 0.88 (20 wt-% from dry) weight-% of the reaction mixture weight-%. The glyoxylation reaction was started by addition of NaOH that was calculated to provide pH 9.1 for the reaction mixture. Sulfuric acid (30%) was added to the reaction mixture to stop the glyoxylation reaction when 33 mPas Brookfield viscosity was measured at 25° C., whereby the pH dropped to 3-4.

The hand sheets were prepared in the same manner than in Example 4 by using European recycled fibre for furnish. The glyoxylated polyacrylamide was added to the mixing vessel 60 s before the sheet preparation. The ash content was 17% in the prepared sheets.

TABLE 7

Effect of glyoxal amount.

| Test | Base Polymer Charge [mol-%] | Glyoxal Amount [w-%, dry] | Base polymer MW [g/mol] | Polymer Dosage [kg/t dry] | SCT index [Nm/g] | Burst index [kPam$^2$/g] |
|---|---|---|---|---|---|---|
| 1 (Ref) | — | — | — | 0 | 20.6 | 1.83 |
| 2 | 13 | 10 | 160000 | 1.5 | 23.8 | 2.25 |
| 3 | 13 | 10 | 160000 | 3 | 24.2 | 2.49 |
| 4 | 13 | 15 | 160000 | 1.5 | 24.1 | 2.28 |
| 5 | 13 | 15 | 160000 | 3 | 25.2 | 2.61 |
| 6 | 13 | 20 | 160000 | 1.5 | 23.3 | 2.28 |
| 7 | 13 | 20 | 160000 | 3 | 24.6 | 2.48 |

It is seen from Table 7 that the produced GPAM provide relatively good results irrespective of used glyoxal amount. It is anticipated that a glyoxal amount between 10 and 20 weight-% might provide the best results.

TABLE 8

Effect of charge of the base polymer.

| Test | Base Polymer Charge [mol-%] | Glyoxal Amount [w-%, dry] | Base polymer MW [g/mol] | Polymer Dosage [kg/t dry] | SCT index [Nm/g] | Burst index [kPam$^2$/g] | CMT30 index [Nm$^2$/g] |
|---|---|---|---|---|---|---|---|
| 8 | 6 | 10 | 150000 | 1.5 | 20.4 | 1.90 | 1.02 |
| 9 | 6 | 10 | 150000 | 3 | 21.8 | 2.00 | 1.07 |
| 10 | 13 | 10 | 150000 | 1.5 | 24.0 | 2.25 | 1.13 |
| 11 | 13 | 10 | 150000 | 3 | 24.2 | 2.49 | 1.19 |
| 12 | 13 | 20 | 140000 | 1.5 | 23.2 | 2.25 | — |
| 13 | 13 | 20 | 140000 | 3 | 24.9 | 2.44 | — |
| 14 | 16 | 20 | 140000 | 1.5 | 23.3 | 2.25 | — |
| 15 | 16 | 20 | 140000 | 3 | 24.6 | 2.29 | — |

It can be seen from Table 8 that Tests 10-13 provide better SCT index and burst strength values. This indicates that GPAM produced using a polyacrylate base polymer having cationicity between 6 mol-% and 18 mol-% of cationic units may be preferable.

TABLE 9

Effect of the molecular weight of the base polymer.

| Test | Base Polymer Charge [mol-%] | Glyoxal Amount [w-%, dry] | Base polymer MW [g/mol] | Polymer Dosage [kg/t dry] | SCT index [Nm/g] | Burst index [kPam$^2$/g] |
|---|---|---|---|---|---|---|
| 16 | 13 | 15 | 135000 | 1.5 | 23.7 | 2.26 |
| 17 | 13 | 15 | 135000 | 3 | 24.6 | 2.48 |
| 18 | 13 | 15 | 155000 | 1.5 | 24.1 | 2.28 |
| 19 | 13 | 15 | 155000 | 3 | 25.2 | 2.61 |
| 20 | 13 | 15 | 185000 | 1.5 | 23.4 | 2.27 |
| 21 | 13 | 15 | 185000 | 3 | 24.2 | 2.49 |

It can be seen from Table 9 that Test 18 and Test 19 provide better SCT index and burst strength values. This indicates that GPAM produced using a polyacrylate base polymer having the weight average molecular weight between 135 000 and 185 000 may be preferable.

Example 6: Application Example Evaluating the Effect of Different Base Polymers and Glyoxal Amounts to the Strength at High Humidity and to the Risk of Score Cracking The effect of different polyacrylamide base polymers and glyoxal amounts on SCT (short span compression strength), SCT at 85% relative humidity (RH) and tensile energy adsorption (TEA) is tested in Example 6. Increased TEA indicates lower risk for score cracking.

The used polyacrylamide base polymers were copolymers of acrylamide and DADMAC. Information about the molecular weight and amount of DADMAC (base polymer charge) in the base polymer is provided in Table 10.

On-site glyoxylation process was performed by using the same pilot reactor as in Example 2. The glyoxylation reaction was started by addition of NaOH that was calculated to provide pH 9.1 for the reaction mixture. Sulfuric acid (30%) was added to the reaction mixture to stop the glyoxylation reaction when 25-35 mPas Brookfield viscosity was measured at 25° C., whereby the pH dropped to 3-4.

The hand sheets were prepared in the same general manner as in Example 4 by using European recycled fibres for furnish. Furnish was wet disintegrated in 3% consistency at 70° C. with a pulper (Noviprofibre, France) for 30 s at 500 rpm and 25 min at 1000 rpm, without soaking. Wet disintegrated pulp was further diluted to 0.6% consistency with tap water, pH was adjusted to pH 6.8 and conductivity to 3.0 mS/cm. The salt for conductivity adjustment consisted of 70% calcium acetate, 20% sodium sulphate and 10% sodium bicarbonate. The glyoxylated polyacrylamide was added to mixing vessel 60 s before the sheet preparation. The ash content was 16% in the prepared sheets. The used glyoxylated polyacrylamide dosages in handsheet preparation for each test are shown in table 10.

The TEA values were measured from air conditioned sheets at 50% RH and 23° C. with Lorenzen & Wettre tensile tester according to ISO standard 1924-3. For SCT at 85% RH measurements the test stripes were air conditioned at 85% RH and 23° C. for at least 4 hours and transferred in plastic bags to Lorenzen & Wettre SCT (STFI) measurement. SCT measurements were performed immediately after taking the sample from the plastic bag. Moisture correction of the test equipment was not used to see the actual strength at high humidity.

SCT, SCT at 85% RH and TEA results were indexed by dividing the measured strength result with the basis weight of the sheet in order to improve the accuracy of the comparison.

The results are shown in Table 10. Tests 32, 35, 36 and 37 are made for 14 mol-% charge level in the base polymer. Tests 34-38 with high molecular weight base polymer have significantly lower added glyoxal amount in solution (<1%) than Tests 32 and 33. This is a clear safety advantage in manufacture as well as an advantage, when the final paper or board is intended for food contact use. Test results for Tests 35-37 indicate that high molecular weight of the base polymer and the dry solids content of the reaction mixture improve values for TEA, SCT and SCT at high humidity. Test 33 and 38 are made from 23 mol-% charge in the base polymer and test 34 is made to 5.5 mol-% charge. Results for test 38 indicate that values for TEA, SCT and SCT at high humidity are especially improved with a high molecular weight of the base polymer also with a higher base polymer charge. The results in Table 10 generally indicate that SCT at high humidity can be surprisingly improved when the aqueous reaction mixture described in this application is used in on-site glyoxylation. Increasing the dosage of the glyoxylated polyacrylamide to 3 kg/t improved the SCT at high humidity even further. It is also seen from Table 10 that based on the measured TEA results, the score cracking can be reduced when selecting molecular weight and base polymer charge properly. The tested glyoxal levels of 9-20% have worked well in this application.

TABLE 10

Base polymer properties, glyoxylation reaction parameters and final viscosities of the obtained polymer composition.

| Test | Dosage [kg/t dry] | Base Polymer Change [mol-%] | Base polymer MW [g/mol] | Added Glyoxal Amount [w-% of dry] | Glyoxalation Dry Solids [w-%] | Added Glyoxal Amount [w-% of solution] | Viscosity [mPas] | TEA Index [J/kg] | SCT Index [Nm/g] | SCT Index at 85% RH [Nm/g] |
|---|---|---|---|---|---|---|---|---|---|---|
| 31 (0-test) | 0 | — | — | — | — | — | — | 390 | 19.0 | 9.3 |
| 32 | 1.8 | 14 | 9000 | 25 | 10 | 2.5 | 25 | 420 | 19.8 | 10.4 |
| 33 | 1.8 | 23 | 10000 | 24 | 12.5 | 3.0 | 25 | 490 | 19.8 | 10.4 |
| 34 | 1.8 | 5.5 | 129000 | 20 | 4.5 | 0.90 | 34 | 440 | 19.2 | 10.0 |
| 35 | 1.8 | 14 | 145000 | 15 | 4.5 | 0.68 | 34 | 500 | 21.2 | 10.6 |
| 36 | 3 | 14 | 145000 | 15 | 4.5 | 0.68 | 34 | 540 | 22.7 | 11.1 |
| 37 | 1.8 | 14 | 145000 | 20 | 4.5 | 0.90 | 34 | 490 | 20.8 | 10.5 |
| 38 | 1.8 | 23 | 120000 | 15 | 4.4 | 0.66 | 32 | 500 | 21.9 | 10.7 |

It is apparent to a person skilled in the art that the invention is not limited exclusively to the examples described above, but that the invention can vary within the scope of the claims presented below.

The invention claimed is:

1. A method for on-site glyoxylation of polyacrylamide in a paper mill or board mill, where a discontinuous batch glyoxylation reaction of an aqueous reaction mixture is performed in a reactor vessel provided with a driven agitator to form an aqueous polymer composition comprising glyoxylated polyacrylamide for use in a manufacturing process of paper or board, the method comprising:
  forming or obtaining the aqueous reaction mixture comprising polyacrylamide base polymer and glyoxal, wherein the polyacrylamide base polymer has a weight average molecular weight in a range of 50 000-300 000 g/mol;

determining alkali consumption of the reaction mixture;

adding to the reaction mixture, on the basis of the determined alkali consumption, a pre-determined amount of alkali which is needed for adjusting the reaction mixture's pH value within a range of 8-10;

optionally adjusting the aqueous reaction mixture's temperature to a temperature range of 15-40° C.;

allowing the on-site glyoxylation reaction of polyacrylamide base polymer in the reaction mixture to proceed;

measuring viscosity of the reaction mixture and/or a process variable that is related to the viscosity of the reaction mixture;

adding acid to the reaction mixture for lowering the pH value of the reaction mixture <8, when a predetermined end viscosity value is attained; and removing the aqueous polymer composition comprising glyoxylated polyacrylamide from the reaction vessel.

2. The method according to claim 1, comprising a step of transferring the aqueous polymer composition from the reaction vessel by a piping via optional storage vessels to the manufacturing process of paper or board.

3. The method according to claim 1, wherein the polyacrylamide base polymer has a weight average molecular weight in a range of 90 000-250 000 g/mol.

4. The method according to claim 1, wherein the polyacrylamide base polymer is obtained by polymerisation of acrylamide and 7-50 mol-% of hydrolytically stable cationic monomers.

5. The method according to claim 1, wherein the reaction mixture has a solids content of 2-8 weight-%.

6. The method according to claim 1, wherein the on-site glyoxylation reaction has a reaction time, which is in a range of 10-120 minutes.

7. The method according to claim 1, wherein the polyacrylamide base polymer and glyoxal are provided as an acidic premixture for forming the reaction mixture.

8. The method according to claim 1, comprising a step of feeding an additional alkali flow to the reaction mixture during the glyoxylation.

9. The method according to claim 1, wherein the temperature of the reaction mixture is measured and adjusted throughout the glyoxylation reaction.

10. The method according to claim 1, wherein the amount of alkali is pre-determined by calculation.

11. The method according to claim 1, wherein the viscosity of the reaction mixture is measured by measuring torque of the driven agitator.

12. The method according to claim 1, wherein the viscosity of the reaction mixture is measured from the reaction mixture by using rotational viscometer, oscillating viscometer or vibrational viscometer.

13. The method according to claim 1, wherein a start viscosity of the reaction mixture measured before alkali is added is in a range of 4-15 cP.

14. The method according to claim 1, wherein the predetermined end viscosity value is in a range of 20-60 cP.

15. The method according to claim 1, wherein the predetermined end viscosity value is 2-7 times the start viscosity of the reaction mixture.

16. The method according to claim 1, wherein the aqueous polymer composition comprises 0.1-1.5 weight-% of residual glyoxal, calculated from the total weight of the aqueous polymer composition.

17. An aqueous reaction mixture suitable for use in a method according to claim 1, wherein the reaction mixture comprises a polyacrylamide base polymer obtained by polymerisation of (meth)acrylamide and 10-25 mol-% of hydrolytically stable monomers, wherein the polyacrylamide base polymer has a weight average molecular weight in the range of 115 000-200 000 g/mol; and 6-25 weight-% of glyoxal, calculated from the dry weight of the prepolymer composition.

18. The aqueous reaction mixture according to claim 17, wherein the reaction mixture has solid content in the range of 3-7 weight-%.

* * * * *